3,206,512
N-DIALKYL-ALKYL- AND -ALKARYL-OXYALKYL-AMINE OXIDES

Adolf Koebner, St. Bees, Cumberland, and Herbert Alexander Potts, Cleator Moor, Cumberland, England, assignors to Marchon Products Limited, Cumberland, England
No Drawing. Filed Jan. 31, 1963, Ser. No. 255,224
Claims priority, application Great Britain, Feb. 7, 1962, 4,669/62; July 18, 1962, 27,593/62
5 Claims. (Cl. 260—570.7)

This invention relates to a new class of surface-active agents and to intermediates for the production thereof.

The new surface-active agents of the invention are amine oxides of the general formula $$Z(OCH_2CH_2)_n - \overset{R^1}{\underset{R^{11}}{N}} \rightarrow O$$

wherein: Z is (a) an alkyl group having from 8 to 18 carbon atoms, or (b) an alkylphenyl group of the formula $XC_6H_4$— where X is an alkyl group having from 6 to 16 carbon atoms, or (c) an acyl-β-aminoethyl group of the formula $YCONHCH_2CH_2$— where Y is an alkyl group having from 7 to 17 carbon atoms; $n$ has a value of from 1 to 10, preferably from 2 to 4; $R^1$ is an alkyl group having from 1 to 4 carbon atoms and $R^{11}$ is either an $R^1$ or $Z(OCH_2CH_2)_n$— group or $R^1$ and $R^{11}$ together form a heterocyclic five- or six-membered ring.

These amine oxides are derived from the corresponding tertiary amines $Z(OCH_2CH_2)_nNR^1R^{11}$ which are also novel compounds useful as intermediates in the production of the amine oxides and constitute another aspect of the present invention.

Amines containing polyoxyethylene ether linkages —$OCH_2CH_2OCH_2CH_2$— have been known for many years, but in all these amines the chain or chains of these linkages have been hydroxyl-terminated. Such amines usually are prepared by reacting an amine having at least one active hydrogen atom with ethylene oxide and therefore have the structure =$N(CH_2CH_2O)_nCH_2CH_2OH$. In contrast, in the amines (and amine oxides) of the present invention the polyoxyethylene ether chain is terminated by a group of the formula Z which has no functional substituent. Accordingly, the present invention provides compounds of different structure and therefore different properties to the compounds hitherto known and such amine oxides have been found to be surface-active agents of particular value for enhancing the properties of compositions also containing other surface-active agents.

Yet a further aspect of the present invention is a process for the preparation of a tertiary amine of the invention, which comprises reacting an organic sulphate of the formula $Z(OCH_2CH_2)_nSO_4M$, wherein Z and $n$ are each as defined above and M is a cation with a secondary amine of the formula $R^1R^{11}NH$ ($R^1$ and $R^{11}$ each being defined as above), the reaction being carried out in the presence of a solvolytic medium and a base at a temperature of at least 100° C.

Yet a further aspect of the present invention is a process for the preparation of an amine oxide of the invention, which comprises reacting an amine of the invention with a peroxidizing agent.

The preparation of the novel tertiary amines by the process of the invention requires an organic sulphate $Z(OCH_2CH_2)_nSO_4M$ as starting material where Z, $n$ and M are as above. Thus the organic sulphate may be an alkyl polyethylene ether sulphate wherein the alkyl group contains from 8 to 18 carbon atoms, or an alkylphenyl polyethylene ether sulphate wherein the alkylphenyl group is of the formula $XC_6H_4$— with X being an alkyl group having from 6 to 16 carbon atoms, or an acyl-β-aminoethyl polyethylene ether sulphate wherein the acyl-β-amino-ethyl group is of the formula $YCONHCH_2CH_2$— with Y being an alkyl group having from 7 to 17 carbon atoms. Preferably the organic sulphate contains from 2 to 4 oxyethylene groups, that is $n$ has a value of 2–4. These organic sulphates are in many instances already commercially-available chemicals for use as surface-active agents. They are themselves prepared by reaction of the appropriate alcohol, alkylphenol ($XC_6H_4OH$), amide ($YCONH_2$) or alkylolamide $$(YCONHCH_2CH_2OH)$$

with ethylene oxide, followed by sulphation of the resulting alkyl, alkylphenyl or acyl-β-amino polyethylene ether alcohol with sulphuric acid, sulphur trioxide or chlorsulphonic acid and subsequent neutralisation with a base to provide the cation M.

The reaction with ethylene oxide does not usually give a uniform product, but a spectrum of compounds in which the value of $n$ varies on either side of a number corresponding to the number of molecular proportions of ethylene oxide reacted with the alcohol, alkylphenol, amide or alkylolamide. Thus it is to be understood that references herein to a single compound containing polyethylene ether linkages are to be construed (wherever the context permits) as including a reference to mixtures of such compounds, the value of $n$ then being an average value denoting the number of molecular proportions of ethylene oxide used in preparing the polyethylene ether alcohol for subsequent sulphation and neutralisation.

The preferred organic sulphates for use in preparing the tertiary amines and amine oxides of the invention are either those derived from natural or synthetic alcohols having 12 to 15 carbon atoms, for example lauryl alcohol, coconut alcohol which is a mixture of primary $C_{12}$ and $C_{14}$ alcohols with a small proportion of $C_{16}$ and $C_{18}$ alcohols, and tridecyl alcohol, or those derived from octylphenols and nonylphenols, particularly p-tert.-octylphenol and p-(1,3,5-trimethylhexyl)phenol. It is also preferred that such sulphates should have been prepared by condensing the alcohol, alkylphenol or alkylolamide with from 2 to 4 molecular proportions of ethylene oxide, followed by sulphation and neutralisation.

The tertiary amines of the invention are prepared from a secondary amine $R^1R^{11}NH$ by reaction with one molecular proportion of organic sulphate. Usually the secondary amine is of the formula $(R^1)_2NH$ and the resulting tertiary amine is then of the formula $$Z(OCH_2CH_2)_nN(R^1)_2$$

However, the secondary amine can also be made in situ by the initial reaction of a primary amine $R^1NH_2$ with the organic sulphate and the resulting secondary amine of the formula $Z(OCH_2CH_2)_nNHR^1$ then reacted with a second molecular proportion of organic sulphate present in the reaction mixture to produce a tertiary amine of the formula $[Z(OCH_2CH_2)_n]_2NR^1$, that is $R^{11}$ of the general formula of the invention is then a further $$Z(OCH_2CH_2)_n—$$

group; this reaction of a primary amine $R^1NH_2$ with two molecular proportions of organic sulphate is included within the scope of the present invention. The amine $R^1R^{11}NH$ preferably contains alkyl groups each having from 1 to 4 carbon atoms, for instance the amine may be dimethylamine, diethylamine or di-n-butylamine; monomethylamine and monoethylamine are also suitable when reacted with two molecular proportions of the organic sulphate. Alternatively, the amine $R^1R^{11}NH$ may be a heterocyclic secondary amine, for example morpholine, piperidine or pyrrolidine.

The present process for preparing the tertiary amines requires that the organic sulphate and amine be heated together at a temperature of at least 100° C. in the presence of a solvolytic medium and a base. By solvolytic medium we mean a highly polar liquid which is a solvent for the organic sulphate. The preferred medium is an aqueous medium containing a dissolved base, that is an aqueous medium having a pH value greater than 7. Other highly polar liquids that may be employed as solvolytic medium include, for example, dimethyl sulphoxide.

Preferably, the reaction temperature is in the range 150–200° C. The use of reaction temperatures above 100° C. in an aqueous medium requires the use of pressure vessels, for example autoclaves. The time of reaction required for complete alkylation of the amine may vary from about 30 minutes to 12 hours, but often it is a period of from 1 to 6 hours.

The base is often an alkali-metal hydroxide or carbonate. However, it can be the amine reactant or a tertiary amine and it is convenient to use an excess of the amine reactant. If desired the cation M in the organic sulphate may be derived from the reactant amine and in such instances the salt of the organic sulphuric acid and the amine is preferably preformed and then heated above 100° C. in an aqueous medium in the presence of an excess of the amine or an additional base.

The tertiary amines of the invention may be purified in conventional manner, for instance by extraction of the reaction mixture with a liquid which removes either the formed tertiary amine or the by-products of the reaction such as the sulphate salt of the base employed. Alternatively, the reaction mixture may be distilled, preferably under reduced pressure, to remove the formed tertiary amine.

The tertiary amines of the invention find use as chemical intermediates, particularly as intermediates for use in preparing the novel amine oxides of the invention.

These amine oxides may be prepared by reacting a tertiary amine of the invention with a peroxidizing agent. Such an agent may be, for instance hydrogen peroxide, a percarboxylic acid or ozone. When hydrogen peroxide is employed, it is preferred that at least a 20 volume solution be used; 30% hydrogen peroxide or stronger often provides a more efficient conversion. As percarboxylic acids it is preferred to use peracetic, perbenzoic or permonophthalic acid. When ozone is employed it is customary to use it dissolved in an inert solvent such as chloroform. Otherwise the oxidation reaction is conveniently carried out in an aqueous medium at ambient temperatures. The tertiary amine is normally mixed with the peroxidizing agent and left to stand until oxidation is complete. This may take from 1 to 24 hours, but a reaction period of about 12 hours provides good results. If desired, the reaction mixture can be subjected to mild heating of up to about 50° C. Mixtures of peroxidizing agents can be used and those mentioned above can be used in conjunction with such compounds as persulphates, persulphuric acids and perborates.

We have also found that a particularly good process for the oxidation of the tertiary amines of the invention is provided by mixing the amine with a substantially equimolecular proportion of hydrogen peroxide present in an aqueous solution of up to 40 volume strength and allowing the reaction mixture to stand at ambient temperature for at least 6 hours, preferably about 12 hours, before adding a minor proportion, preferably about 0.15 of a molecular proportion, of a percarboxylic acid, preferably an aliphatic percarboxylic acid such as peracetic acid, and allowing the reaction mixture to stand for a further period of at least 30 minutes, preferably for some hours.

The amine oxide may be separated from the reaction mixture by extraction with a suitable solvent, but this is not normally necessary if the amine oxide is prepared in an aqueous medium in which it is soluble and is to be used in the form of such a solution. In these instances the reaction mixture is simply extracted with a water-immiscible liquid, for example light petroleum which removes any unreacted amine and then used as such. The amine oxides are not readily distilled even at reduced pressure as on heating they tend to decompose.

The preferred amine oxides of the invention are those prepared from the preferred amines of the invention previously described.

The amine oxides of the invention find particular use as surface-active agents. They are also mildly bacteriostatic and therefore find a use in germicidal soaps and detergent compositions, such as shampoos. Some of them are also useful softening agents for textiles.

The amine oxides can be used alone as surface-active agents; but it is much preferred to use them in compositions admixed with at least one other surface-active agent which is anionic or non-ionic, for instance with salts of alkylarylsulphonic acids where the alkyl group contains from 8 to 18 carbon atoms, for example sodium dodecylbenzenesulphonate; alkyl sulphates where the alkyl group contains from 8 to 18 carbon atoms, for example lauryl sulphate; alkyl polyether sulphates where the alkyl group contains from 8 to 18 carbon atoms, for example lauryl polyethylene ether sulphates derived from 2 to 4 molecular proportions of ethylene oxide (which are preferred for present purposes); and non-ionic surface-active agents such as alkyl polyethylene ether alcohols derived from alcohols having 8 to 18 carbon atoms and 1 to 20 molecular proportions of ethylene oxide; and alkylphenyl polyethylene ether alcohols derived from alkylphenols having from 6 to 16 carbon atoms in the alkyl group and from 1 to 20 molecular proportions of ethylene oxide.

The amine oxides may be used in liquid or solid detergent formulations of the light or heavy duty type. Such compositions may contain the usual additives, for instance, foam-boosters such as coconut alcohol monoethanolamide; solium tripolyphosphate; tetrapotassium pyrophosphate; soda ash; sodium metasilicate; sequestering agents such as aminopolycarboxylate salts, for example salts of ethylenediamine tetra-acetic acid; hydrotropes such as sodium toluene or xylene sulphonates; solvents such as ethanol or isopropanol, perfumes and colouring additives. In such compositions the amine oxide is normally present in an amount of from 1 to 25%, preferably 1–10% by weight of the composition, which may be, however, further diluted for washing purposes.

The invention will now be illustrated by the following examples in which all quantities (unless otherwise stated) are expressed as parts by weight. Examples 1 and 2 illustrate the production of the tertiary amines of the invention, Examples 3 and 4 the production of amine oxides of the invention, and Examples 5 and 6 compositions containing the amine oxides admixed with other surface-active agents.

*Example 1.—N-(lauryl tri-β-ethoxy)-dimethylamine*

Sodium lauryltri-β-ethoxy sulfate (1 mole as 30% aqueous solution which had been obtained by reacting lauryl alcohol with 3 moles of ethylene oxide, followed by sulphation and sodium neutralisation) and dimethylamine (2 moles) were heated at 180° C. with stirring in a stainless steel autoclave for 3 hours. After cooling, the contents of the autoclave were shaken up with caustic soda (40 parts) and the top oily layer separated, washed with water and dried. There was obtained N-(lauryltri-β-ethoxy)-dimethylamine (335 parts) having an amine value of 152 mg. KOH/gm.

*Example 2.—N-[p-(1,3,5-trimethylhexyl)-phenyl-tetra-β-ethoxy]-dimethylamine*

Nonylphenyltetra-ethoxy sulphate (1,000 parts as 50% solution in water) (which had been obtained by reacting p-(1,3,5-trimethylhexyl)-phenol with 4 moles of ethylene oxide with subsequent sulphation and sodium neutralisation) was mixed with dimethylamine (100 parts) and heated with stirring at 160° C. for 3 hours in a stainless steel autoclave. After cooling, the oily product was purified as described in Example 1 to provide N-[p-(1,3,5-trimethylhexyl) - phenyl - tetra-β-ethoxy]-dimethylamine (427 parts) having an amine value of 133.1 mg. KOH/gm.

*Example 3.—N-(lauryl tri-β-ethoxy)-dimethylamine oxide*

N-(lauryltri-β-ethoxy)-dimethylamine (172 parts) as prepared in Example 1 was added with shaking to water (250 parts) containing hydrogen peroxide (58.6 parts by volume of a 29% w./v. solution). After a few minutes the mixture became homogeneous and it was allowed to stand for 12 hours, during which period the viscosity of the mixture increased. Peracetic acid, which had been made by mixing acetic anhydride (10 parts by volume) with hydrogen peroxide (10 parts by volume of a 29% w./v. solution) and concentrated sulphuric acid (0.1 part), was then stirred into the mixture which was allowed to stand for a further 12 hours. The product was shown to contain 36% of N-(lauryl-tri-β-ethoxy)-dimethylamine oxide as an aqueous solution in water containing traces of free amine.

*Example 4.—N-[p-(1,3,5-trimethylhexyl)-phenyl-tetra-β-ethoxy]-dimethylamine oxide*

N-[p-(1,3,5-trimethylhexyl-phenyl-tetra - β - ethoxy]-dimethylamine (423 parts) as prepared in Example 2 was stirred with water (700 parts) and hydrogen peroxide (117.2 parts by volume of a 29% w./v. solution). After a few minutes the mixture became homogeneous and it was allowed to stand for 12 hours during which period the viscosity of the mixture increased. Peracetic acid, which had been made by mixing acetic anhydride (20 parts by volume) with hydrogen peroxide (20 parts by volume of a 29% w./v. solution) and concentrated sulphuric acid (0.1 part) was then stirred into the mixture which was allowed to stand for a further 12 hours. The product was shown to contain 35% of N-[p-(1,3,5-trimethylhexyl) - phenyl-tetra-β-ethoxy] dimethylamine oxide as an aqueous solution in water containing traces of free amine.

*Example 5*

A light duty liquid dishwashing detergent composition was formulated as follows:

| | Percent |
|---|---|
| Sodium lauryltri-β-ethoxy sulphate | 15 |
| N-(lauryltri-β-ethoxy)-dimethylamine oxide | 5 |
| Water | 80 |

This composition was a clear, low viscosity liquid with good sudsing and grease removal properties.

*Example 6*

A general purpose liquid detergent composition was formulated as follows:

| | Percent |
|---|---|
| Sodium lauryltri-β-ethoxy sulphate | 13 |
| N-[p-(1,3,5-trimethylhexy)-phenyl-tetra-β-ethoxy]-dimethylamine oxide | 3 |
| Tetrapotassium pyrophosphate | 14 |
| Potassium toluenesulphonate | 10 |
| Water | 60 |

This composition was a clear low viscosity liquid with good sudsing and detergent properties.

What we claim is:

1. An amine oxide of the formula

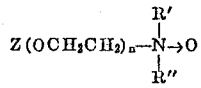

wherein Z is selected from the group consisting of alkyl groups having 12 to 15 carbon atoms and alkylphenyl groups in which the alkyl group has from 8 to 9 carbon atoms, $n$ has a value from 2 to 4 and R' and R" are selected from the group consisting of alkyl having 1 to 4 carbon atoms and R' and R" taken together with the nitrogen atom form a group selected from the group consisting of morpholine, piperazine and pyrrolidine.

2. The amine oxide of claim 1 wherein Z is an alkyl group having 12–15 carbon atoms, and R' and R" are each alkyl groups having 1 to 4 carbon atoms.

3. The amine oxide of claim 1 wherein Z is an alkylphenyl group in which the alkyl group has from 8 to 9 carbon atoms, and R' and R" are each alkyl groups having 1 to 4 carbon atoms.

4. N-(lauryl-tri-β-ethoxy)-dimethylamine oxide.

5. N - [p - (1,3,5-trimethylhexyl) - phenyl - tetra - β-ethoxy]-dimethylamine oxide.

References Cited by the Examiner

UNITED STATES PATENTS

| | | | |
|---|---|---|---|
| 2,115,250 | 4/38 | Bruson | 260—570.7 |
| 2,169,976 | 8/39 | Guenther et al. | 260—561 |
| 2,229,024 | 1/41 | Bruson | 260—570.7 XR |
| 2,302,388 | 11/42 | Hester. | |
| 2,547,365 | 4/51 | Bock et al. | 260—570.7 XR |
| 2,717,270 | 9/55 | Bindler | 260—584 |

FOREIGN PATENTS 285,749  1/53  Switzerland.

OTHER REFERENCES

Culvenor: "Reviews Pure and Applied Chem.," volume 13, pages 83–114 (1953).

CHARLES B. PARKER, *Primary Examiner.*